United States Patent [19]

Allan

[11] 4,008,170
[45] Feb. 15, 1977

[54] DRY WATER

[75] Inventor: Barry D. Allan, Huntsville, Ala.

[73] Assignee: The United States of America as represented by the Secretary of the Army, Washington, D.C.

[22] Filed: Nov. 28, 1975

[21] Appl. No.: 636,328

[52] U.S. Cl. .................................. 252/194; 252/2; 252/69; 252/449
[51] Int. Cl.$^2$ .......................................... C09K 3/00
[58] Field of Search ............ 252/194, 449; 423/336

[56] References Cited

UNITED STATES PATENTS

| | | | |
|---|---|---|---|
| 2,990,249 | 6/1961 | Wagner | 423/336 |
| 3,103,495 | 9/1963 | Wagner et al. | 252/317 |
| 3,393,155 | 7/1968 | Schutte et al. | 252/316 |
| 3,607,777 | 9/1971 | Winyall et al. | 252/194 X |

*Primary Examiner*—Richard D. Lovering
*Attorney, Agent, or Firm*—Nathan Edelberg; Robert P. Gibson; Jack W. Voigt

[57] ABSTRACT

A submicroscopic particulate silica having a particle size range from about 15–20 m$\mu$ that is prepared in a hot gaseous environment at about 1100° C by the vapor phase hydrolysis of a silicon compound is reacted with liquid water in a ratio in weight percent of about 1 part water to about 9 parts water to 1 part of the particulate silica to yield a powdered product which remains flowable over a wide temperature range — even when cooled to an extremely low temperature of −196° C. The adsorbed water is liberated on heating the powdered product. The powdered product with adsorbed water up to about 90 weight percent has utility as a coolant by liberating water on heating. The powdered product is useful as moisture source for miscellaneous purposes over a wide temperature range.

2 Claims, No Drawings

DRY WATER

DEDICATORY CLAUSE

The invention described herein may be manufactured, used, and licensed by or for the Government for governmental purposes without the payment to me of any royalties thereon.

BACKGROUND OF THE INVENTION

Water has such a wide variety of utilities that enumerating them would be redundancy. The efficiency of the utilization of water is closely related to its ready availability and storable condition. The present invention relates to a convenient source of water stored in a readily usable form for use over a wide temperature range without requiring protection from freezing.

Water is one of the most widely used coolants. In fact, the efficacy of water as a fire extinguishment aid is dependent on its coolant properties which are improved when the water is in a finely divided state. For this purpose wetting agents are employed. The use of water with a wetting agent added as an aid for preventing excessive dust formation during the crushing and transporting of the crushed coal by conveyor belts has improved the safety conditions at coal processing plants and steam plants.

Since water has such a large capacity for heat its usefulness as a coolant to retard reaction rates due to rises in temperature has long been recognized. The release of a large amount of water from a dry storable source is a new use that would offer numerous advantages, particularly, if the dry storable source is in a finely divided state wherein the source is flowable over a wide temperature range even at subfreezing temperatures.

Therefore, an object of this invention is to provide a source of water stored in a dry, but flowable state, whereby the water is readily released from the source when heated.

Another object of this invention is to provide a source of water which remains flowable when cooled to $-196°$ C and which can yield at least about 75 weight percent water when heated.

SUMMARY OF THE INVENTION

A submicroscopic particulate silica having a particle size range from about 15-20 m$\mu$ and that is prepared in a hot gaseous environment at about 1100° C by the vapor phase hydrolysis of a silicon compound is reacted with liquid water in a ratio in weight percent of about 1 part water to about 9 parts water to 1 part of the particulate silica to yield a powdered product which remains flowable over a wide temperature range — even when cooled to an extremely low temperature of −196° C. The particulate silica can adsorb up to about 90% of its weight of water. The particulate silica with 75% adsorbed water by weight was cooled to −196° C and remained flowable which was unexpected both from the amount of water adsorbed and from the fact that the flowable state was retained even while at the low temperature. A high water content product flowable at the extremely low temperature is useful as a source of water for many miscellaneous purposes.

DESCRIPTION OF THE PREFERRED EMBODIMENTS

The submicroscopic particulate silica employed in this invention has the following chemical and physical properties:

| Property Determined | Value Obtained |
| --- | --- |
| Silica Content (moisture-free basis) | 99.9% min. |
| Free Moisture | 1.5% max. |
| Ignition Loss (1000° C) | 1.0% max. |
| Particle Size Range | 0.015–0.020 micron (15–20 m$\mu$) or 150–200 A |
| Surface Area (Nitrogen Adsorption) | 200 ± 25 sq. meters/gm |
| Specific Gravity | 2.2 |
| Color | White |
| Bulking Value | 0.0546 gal./lb. |
| Moisture (Adsorbed) After 48 Hours Exposure at almost 100% Relative Humidity at 25°C | 2% max. |

The submicroscopic particulate silica with properties listed above is available under the tradename CAB-O-SIL from Cabot Corporation. When CAB-O-SIL is initially formed at 1100° C, it is essentially free from both physically adsorbed and chemically combined water. Maximum water adsorbed under ordinary atmospheric conditions is usually below 1%; however, under atmospheres of almost 100% relative humidity at 25° C for 48 hours CAB-O-SIL shows only a maximum of about 2% moisture physically adsorbed.

CAB-O-SIL has been employed in various applications in the prior art. For example, in typical applications the main functions of CAB-O-SIL have been as a reinforcing agent, suspending agent, flatting agent, thickening and gelling agent, thixotropic agent, anticaking agent, and antislip agent.

Preparation of "Dry Water"

EXAMPLE I 100 grams of submicroscopic particulate silica having a particle size in the range from about 15–20 m$\mu$ is placed in a container and 300 grams of water at room temperature is added slowly while stirring. After all of the water is added the powdered product was tested for moisture content. The product liberated 75% moisture based on loss of weight after heating.

The powdered silica product with 75% water adsorbed was cooled to −196° C at which temperature the powdered product was still flowable. The adsorbed water was recovered on heating in bomb tests. The fact that the product remains flowable with the large quantity of adsorbed water, the product is termed: "dry water."

EXAMPLE II 100 grams of submicroscopic particulate silica having a particle size in the range from about 15–20 m$\mu$, is placed in a container and 1000 grams of water at room temperature is added slowly while stirring. The excess water not adsorbed is removed by placing the reaction silica product on a filter to remove the excess water. After the excess water is removed and the reaction silica product is allowed to dry at room temperature, the reaction silica product remains as a flowable powder. Moisture determination on the flowable powder indicated that the submicroscopic particulate silica had adsorbed about 80–90 weight percent water.

Dry water was developed for use as a flowable powder source of water which is released by heating. The released water in a specific use had a cooling effect to a reaction between IRFNA (inhibited red fuming nitric acid) and the fuel rich gases used to expel the IRFNA that is employed in a liquid rocket motor, such as the Army Lance Missile, which uses a hypergollic reaction for ignition of liquid fuels. In this specific use, leakage of IRFNA by the piston employed to expel the IRFNA resulted in reaction between the IRFNA and the hot fuel rich gases which normally caused failure by explosion and/or excessive heating. By placing some of the dry water in the area back of the piston where the gas generator fuel rich gases drive the piston, if some IRFNA leaked by the piston during a brief interval of time at maximum pressure and maximum temperature, the dry water releases the adsorbed water to produce rapid cooling and a neutralizing effect to the IRFNA reaction to prevent surpassing the critical temperature causing failure of the system.

Dry water serves as an extinguishment aid to firefighting since it releases water that results in a cooling affect to burning materials. In fact, dry water could be placed in the vicinity of where extra protection against fire spreading is considered likely. It would have a retardant action against a fire from spreading by the rapid liberation of water upon heating which results in a cooling effect to slow down the burning or extinguish the burning.

Where a source of water is required in an extremely cold environment, dry water is attractive, particularly in the cold environment of outerspace. Dry water can be stored in a spaceship without regard to any freezing temperature that may be reached where stored since dry water containing about 75% by weight adsorbed water is a flowable powder even at $-196°$ C. When the water is desired to be recovered from dry water, either batch wise or continuously, the procedure would simply include a means for heating and a means for condensing the water that is adsorbed by the silica, that is, if the water is desired in a liquid state for general purpose use; otherwise, only a means for heating is all that is required. The flowable powder state facilitates the release of water by heat.

The submicroscopic particulate silica employed in this invention has no internal surface, therefore, the silica is in a finely divided state with an enormous external surface area. It is neither a gelatinous nor a porous silica, whereas silica gels and silica aerogels are constituted of over 90% internal surface area. This makes the surface of the submicroscopic particulate silica highly reactive. One gram of the submicroscopic particulate silica contains over $11 \times 10^{15}$ particles and has a surface area of about 200 square meters. Caution: Continued excessive inhalation of the submicroscopic silica, as with any dust of finely divided particles, should be avoided by use of adequate ventilation and well-fitting dust masks during the handling of the finely divided particles.

I claim:

1. The powdered reaction product of liquid water and a submicroscopic particulate silica that is at least 99.9 percent silica and that has a particle size range from about 15–20 m$\mu$, said submicroscopic particulate silica prepared in a hot gaseous environment at about 1100° C by the vapor phase hydrolysis of a silicon compound, said powdered reaction product prepared by adding slowly, while stirring, liquid water in ratio in weight percent of about 1 part water to about 9 parts water to 1 part of said submicroscopic particulate silica to yield said powdered reaction product containing from about 50 weight percent up to about 90 weight percent adsorbed water.

2. The powdered reaction product of claim 1 wherein said reacting is accomplished by reacting about 3 parts liquid water with 1 part of said submicroscopic particulate silica to yield said powdered reaction product that contains about 75 weight percent adsorbed water, said powdered reaction product being a flowable, powdered product that remains flowable when cooled to $-196°$ C and which liberates said weight percent adsorbed water when heated.

* * * * *